May 14, 1963     H. CLAUSS     3,089,328

SLIDING CLASP FASTENER

Filed May 19, 1961

INVENTOR

HARRY CLAUSS by Walter S. Pleston

ATTORNEY

United States Patent Office 3,089,328
Patented May 14, 1963

3,089,328
SLIDING CLASP FASTENER
Harry Clauss, Unterpfaffenhofen, near Munich, Germany, assignor to Ries G.m.b.H., Bekleidungsverschluss-Fabrik, Unterpfaffenhofen, near Munich, Germany
Filed May 19, 1961, Ser. No. 111,370
Claims priority, application Germany May 19, 1960
3 Claims. (Cl. 70—68)

This invention concerns sliding clasp fasteners having locking means for locking the slide or clasp of the fastener at any desired position therealong.

Various arrangements are already known for locking the slides or clasps of sliding clasp fasteners. For example, locking is effected, in one way, by the engagement of a protrusion on a draw-tongue of the fastener between the teeth of the fastener. It is also known to provide a stirrup or the like on the draw-tongue of the fastener, such stirrup or the like being engageable with a lock arranged adjacent one end of the fatsener bands or stringers.

Slides or clasps are also known which embody a locking element engaged or disengaged by a combination lock built into the slide or clasp.

The object of the present invention is to provide an arrangement having a slide or clasp which can be locked positively in any desired position and retained in such position by means of a lock having a removable key, the lock being such that it can be embodied in the slide or clasp of the fastener without appreciably increasing the size thereof and which can be produced comparatively inexpensively.

The sliding clasp fastener according to this invention is characterised in that the lock is disposed in a centre piece of the slide or clasp and comprises a locking member in the form of a bolt slidably mounted in the centre piece.

Preferably, the lock comprises a cam disc rotatably mounted in an aperture in the centre piece and having an eccentric cam part which engages into a recess in the bolt to permit movement of the latter centrally of the centre piece.

Advantageously, a groove is provided in the face of the cam part which confronts the bolt, for engagement with the latter under the influence of a spring washer disposed between the cam disc and a cover plate of the slide or clasp to retain the cam disc in its positions corresponding respectively to the locked and unlocked positions of the bolt.

With the preferred arrangement according to the invention, locking of the slide or clasp is effected by rotating the cam disc to displace the bolt to an operative position in which the bolt protrudes from the centre piece and engages the teeth or the like of the fasteners where the two rows of such teeth or the like converge within the slide or clasp, whilst unlocking releasing is effected by rotation of the cam disc through 180° from its position corresponding to the operative position of the bolt, so as to withdraw the bolt to an inoperative or non-locking position withdrawn into the centre piece of the slide or clasp, wherein it is clear of the teeth or the like.

The eccentricity of the cam part of the cam disc, in the preferred embodiment of the invention, will be arranged so that the displacement of the bolt is effective to bring the latter to an operative position which will serve to lock the slide or clasp relative to the teeth without damaging such teeth. Locking is achieved by the bolt by reducing the usual converging passages in the slide to a width which is insufficient to permit the teeth to pass therethrough.

The invention will be described further, by way of example, with reference to the accompanying drawings, in which.

Figure 3:
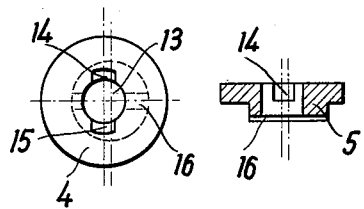
FIG. 3 shows, both in plan view and elevation, a cam disc of the slide of FIGS. 1 and 2, the position of the disc corresponding to FIG. 1.
Figure 4:
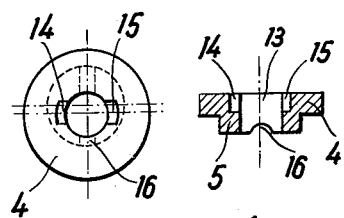
FIG. 4 shows the same cam disc in a manner similar to FIG. 3, but with the disc position corresponding to FIG. 2.
Figure 5:
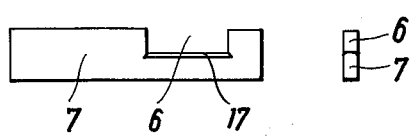
FIG. 5 shows, both in side elevation and in diagrammatic end elevation, the bolt of the slide of FIGS. 1 and 2.

As shown in the drawings, a sliding clasp fastener comprises a slide having a V-shaped centre piece 1 which has a circular aperture 3 wherein is accommodated a lock comprising a cam disc 4 the details of which are visible in FIGS. 3 and 4. As can be seen, the cam disk 4 embodies an eccentric cam part 5.

Figure 1:
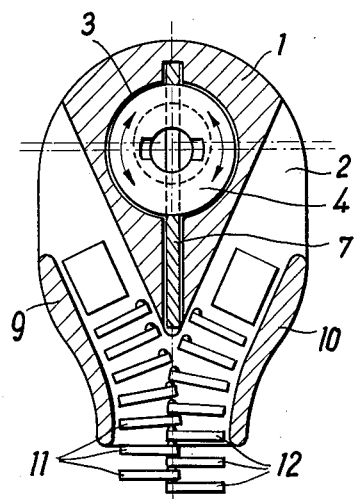
FIG. 1 is a fragmentary cross-sectional plan view showing a sliding clasp fastener in accordance with the invention, the fastener slide being shown in relation to the teeth of the stringers of the fastener, and being shown in its free condition.
Figure 2:
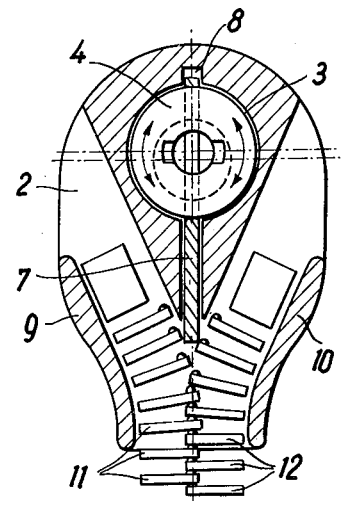
FIG. 2 is a view similar to FIG. 1, but showing the slide in its locked condition.

Centrally of the centre piece 1 is a groove or slot 8 (FIG. 2) wherein is slidably disposed a bolt 7 of the lock which bolt 7 extends under the cam disc 4 and has a recess 6 into which the cam part 5 engages. This bolt 7 constitutes a locking member of the slide and it will be appreciated that rotation of the cam disc 4 will cause the bolt 7 to be displaced between its inoperative position shown in FIG. 1 and an operative position shown in FIG. 2. In the inoperative position, the bolt 7 is withdrawn so that the end of the bolt 7 which corresponds to the apex of the centre piece 1 is disposed within the centre piece 1 and does not obstruct the passage of the slide along the fastener teeth 11, 12, which are provided on conventional stringers and enter the slide 2 between side checks 9 and 10 of the slide, whilst in the operative position such end of the bolt 7 protrudes from the centre piece and engages with the teeth 11, 12 to lock the slide 2 relative to the teeth 11, 12.

The cam disc 4 has a central hole 13 which extends through the cam part 5 and which serves for the reception of the shank of a locking key (not shown). Side recesses 14 and 15 are provided around the hole 13 and these serve for the reception of the bits of the key, and it will be appreciated that such side recesses 14, 15 can be positioned and shaped appropriately for ensuring that the lock of the slide can only be opened or locked by means of its own individual key.

Figure 6:
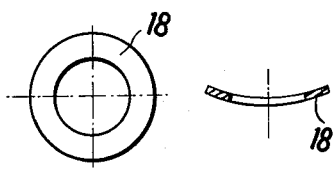
FIG. 6 shows, both in plan view and diametric cross-section, a spring washer embodied in the slide of FIGS. 1 and 2 but which is not visible in the latter figures.

On the undersurface of the cam part 5 which confronts the bolt 7, there is provided a shallow hollow groove 16 (see particularly FIGS. 3 and 4), whilst the spring washer 18 (shown in FIG. 6, but not visible in FIGS. 1 and 2) is provided on the upper surface of the cam disc 4 between the latter and a top plate (not visible in the drawings) of the slide 2 so as to ensure that the cam part 5 is urged into contact with the top surface 17 of the bolt 7 in correspondence with the recess 6.

The operation of the slide will be evident from the foregoing description. In the inoperative position of the lock bolt 7 shown in FIG. 1, the slide can be moved back and forth along the fastener teeth 11, 12 in a conventional manner. In such condition of the lock, the groove 16 of the cam disc 4 registers with and is engaged by the top surface 17 of the bolt recess 6 under the influence of the spring washer 18 and unintentional rotation thereof is thereby prevented. For locking the slide, the key is inserted by its shank through a keyhole (not shown) in the top plate of the slide to engage into the hole 13 of the cam disc until the key bits enter into the side recesses 14, 15. The cam disc 4 can then be rotated through 180° until the groove 16 is once again in register with and engaged by the top surface 17 of the bolt recess 6, the washer 18 permitting slight axial movement of the cam disc 4 for disengagement of the groove 16 and surface 17 at commencement of rotation. During such rotation, the cam part 5 of the cam disc 4, by engagement with the ends of the recess 6, slides the bolt 7 to the operative position of FIG. 2. Unlocking of the slide is similarly effected by subsequent rotation of the cam disc 4 through 180° by means of the key.

I claim:

1. A sliding clasp fastener having two rows of teeth, a slide movable along said rows of teeth in one direction to cause interengagement thereof and in the opposite direction to cause separation thereof, said slide having two converging side checks between which is disposed a V-shaped centre piece defining two converging passages for said rows of teeth and embodying key-operated locking means accommodated in said centre piece, said locking means comprising a bolt mounted on said centre piece and slidable thereon between an operative position in which said bolt protrudes from said centre piece in said opposite direction and simultaneously engages said two rows where they converge, and an inoperative retracted position clear of said rows of teeth, and means for moving said bolt between said positions thereof.

2. A sliding clasp fastener having two rows of teeth a slide movable along said rows of teeth in one direction to cause interengagement thereof and in the opposite direction to cause separation thereof, said slide having converging side checks between which is disposed a V-shaped centre piece defining converging passages for said rows of teeth and embodying key-operated locking means accommodated in said centre piece, said locking means comprising a bolt which is slidably arranged in said centre piece so to be movable between an operative position protruding from said centre piece to engage said rows of teeth where they converge and an inoperative retracted position clear of said rows of teeth, a recess in said bolt, and a cam disc rotatably mounted in an aperture in said centre piece, said cam disc having an eccentric part which engages into said recess and serves to move said bolt upon rotation of said cam disc.

3. A sliding clasp fastener as set forth in claim 2 and having, in that face of said cam part which confronts said bolt, a shallow groove engageable with said bolt in said operative and inoperative positions of said bolt, a spring washer acting on said cam disc to urge said groove into engagement with said bolt.

References Cited in the file of this patent

FOREIGN PATENTS 635,387    Great Britain _____ Apr. 5, 1950